(12) United States Patent
Bennett et al.

(10) Patent No.: US 7,366,884 B2
(45) Date of Patent: Apr. 29, 2008

(54) CONTEXT SWITCHING SYSTEM FOR A MULTI-THREAD EXECUTION PIPELINE LOOP AND METHOD OF OPERATION THEREOF

(75) Inventors: Victor A. Bennett, Rockwall, TX (US); Sean W. McGee, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 556 days.

(21) Appl. No.: 10/082,776

(22) Filed: Feb. 25, 2002

(65) Prior Publication Data

US 2003/0163675 A1    Aug. 28, 2003

(51) Int. Cl.
*G06F 9/44* (2006.01)
(52) U.S. Cl. ............... 712/228; 712/206; 712/215
(58) Field of Classification Search ......... 712/206, 712/215, 228
See application file for complete search history.

(56) References Cited

U.S. PATENT DOCUMENTS

| | | | | |
|---|---|---|---|---|
| 5,509,006 | A * | 4/1996 | Wilford et al. | 370/401 |
| 5,933,627 | A * | 8/1999 | Parady | 712/228 |
| 6,016,542 | A * | 1/2000 | Gottlieb et al. | 712/225 |
| 6,216,220 | B1 * | 4/2001 | Hwang | 712/219 |
| 6,295,600 | B1 * | 9/2001 | Parady | 712/228 |
| 6,535,905 | B1 * | 3/2003 | Kalafatis et al. | 718/108 |
| 6,578,065 | B1 * | 6/2003 | Aglietti et al. | 718/104 |
| 6,578,137 | B2 * | 6/2003 | Parady | 712/228 |
| 6,694,425 | B1 * | 2/2004 | Eickemeyer | 712/216 |
| 6,931,639 | B1 * | 8/2005 | Eickemeyer | 718/104 |
| 6,988,186 | B2 * | 1/2006 | Eickemeyer et al. | 712/217 |
| 2003/0005263 | A1 * | 1/2003 | Eickemeyer et al. | 712/218 |

OTHER PUBLICATIONS

Byrd, Gregory T. nd Holliday, Mark A. "Multithreaded Processor Architectures". IEEE Spectrum. © Aug. 1995. pp. 38-46.*
Kon, Fabio and Medina, Mario R. "Round-Robin Scheduling". © Jan. 29, 1996. Title Page and "What is Round-Robin Scheduling?" sections.*
Rosenberg, Jerry M. "Dictionary of Computers, Information Processing, and Telecommunications". Second Edition. New York: John Wiley & Sons, Inc. © 1987. pp. 189; 195-196; and 419.*
Hennessy, John L. and Patterson, David A. "Computer Architecture: A Quantitative Approach". Second Edition. San Francisco, CA: Morgan Kaufmann Publishers, Inc., © 1996. pp. 32-33, 39-41, and 132-137.*
Microware™. "OS-9: Real-Time Operating System—The Complete Software Solution for Your Embedded Application". © 1999 http://210.113.89.242/incoming/ip_esw/5329-OS9_wp.pdf.*

(Continued)

*Primary Examiner*—Aimee J. Li (57) ABSTRACT

A context switching system for a multi-thread execution pipeline loop having a pipeline latency and a method of operation thereof. In one embodiment, the context switching system includes a context switch requesting subsystem configured to: (1) detect a device request from a thread executing within the multi-thread execution pipeline loop for access to a device having a fulfillment latency exceeding the pipeline latency, and (2) generate a context switch request for the thread. The context switching system further includes a context controller subsystem configured to receive the context switch request and prevent the thread from executing until the device request is fulfilled.

18 Claims, 6 Drawing Sheets

OTHER PUBLICATIONS

Free On-lin Dictionary of Computing. © 1995 http://foldoc.org search term: queue.*
Free On-lin Dictionary of Computing. © 1999 http://foldoc.org search term: first-in first-out.*
Chu, Wanming and Li, Yamin. "The Effects of STEF on Finely Parallel Multithreaded Processors". IEEE. © 1995. pp. 318-324.*
Cavendish, Dirceu . "CORPS—A Pipelined Fair Packet Scheduler for High Speed Switches". IEEE. Jun. 2000. pp. 55-64.*

* cited by examiner

CONTEXT SWITCHING SYSTEM FOR A MULTI-THREAD EXECUTION PIPELINE LOOP AND METHOD OF OPERATION THEREOF

TECHNICAL FIELD OF THE INVENTION

The present invention is directed, in general, to network packet processors and, more specifically, to a context switching system for a multi-thread execution pipeline loop and method of operating the same.

BACKGROUND OF THE INVENTION

Communications networks are currently undergoing a revolution brought about by the increasing demand for real-time information being delivered to a diversity of locations employing multiple protocols. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers and/or switches. The routers and switches allow intelligent passing of information and data files between remote sites. However, increased demand and the sophistication required to route current information and data files, which may employ different protocols, quickly challenged the capabilities of existing routers and switches.

More specifically, network processors, such as the microprocessors employed in routers and switches, must be able to process multiple protocol data units (PDUs) at the same time. Typically, current network processors achieve multi-processing of PDUs by assign an execution thread to each PDU. Each thread executes code, independently of the other threads, to process the PDUs. However, network processors are limited to specific amounts of memory on the chip or in cache memory to hold instructions and/or data. When a thread executing in the network processor needs to access off-chip memory, that thread is delayed until the request is fulfilled. The delay may cause the execution of all the other threads to be suspended until the request is fulfilled or prevent a new thread from being able to start execution. Another problem associated with the delay is the amount of precious thread execution cycles expended to process and determine if the request has been fulfilled. In view of the ever increasing demand for higher transmission speeds these problems are highly undesirable.

Accordingly, what is needed in the art is a system to overcome the deficiencies of the prior art.

SUMMARY OF THE INVENTION

To address the above-discussed deficiencies of the prior art, the present invention provides a context switching system for a multi-thread execution pipeline loop having a pipeline latency and a method of operating the same. In one embodiment, the context switching system includes a context switch requesting subsystem configured to detect a device request from a thread executing within the multi-thread execution pipeline loop for access to a device having a fulfillment latency exceeding the pipeline latency, and generate a context switch request for the thread. Additionally, the context switching system includes a context controller subsystem configured to receive the context switch request and prevent the thread from executing until the device request is fulfilled.

In another embodiment, the present invention provides a method of operating a context switching system for use with a multi-thread execution pipeline loop having a pipeline latency, the method includes: (1) detecting a device request from a thread executing within the multi-thread execution pipeline loop for access to a device having a fulfillment latency exceeding the pipeline latency, (2) generating a context switch request for the thread when the thread issues the device request, and (3) receiving the context switch request and preventing the thread from executing until the device request is fulfilled.

The present invention also provides, in one embodiment, a fast pattern processor that receives and processes protocol data units (PDUs) that includes a dynamic random access memory (DRAM) that contains instructions, a memory cache that caches certain of the instructions from the DRAM, and a tree engine that parses data within the PDUs and employs the DRAM and the memory cache to obtain ones of the instructions. The tree engine includes a multi-thread execution pipeline loop having a pipeline latency, and a context switching system for the multi-thread execution pipeline loop. The context switching system includes a context switch requesting subsystem that: (1) detects a device request from a thread executing within the multi-thread execution pipeline loop for access to a device having a fulfillment latency exceeding the pipeline latency, and (2) generates a context switch request for the thread when the thread issues the device request. The context switching system further includes a context controller subsystem that receives the context switch request and prevents the thread from executing until the device request is fulfilled.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
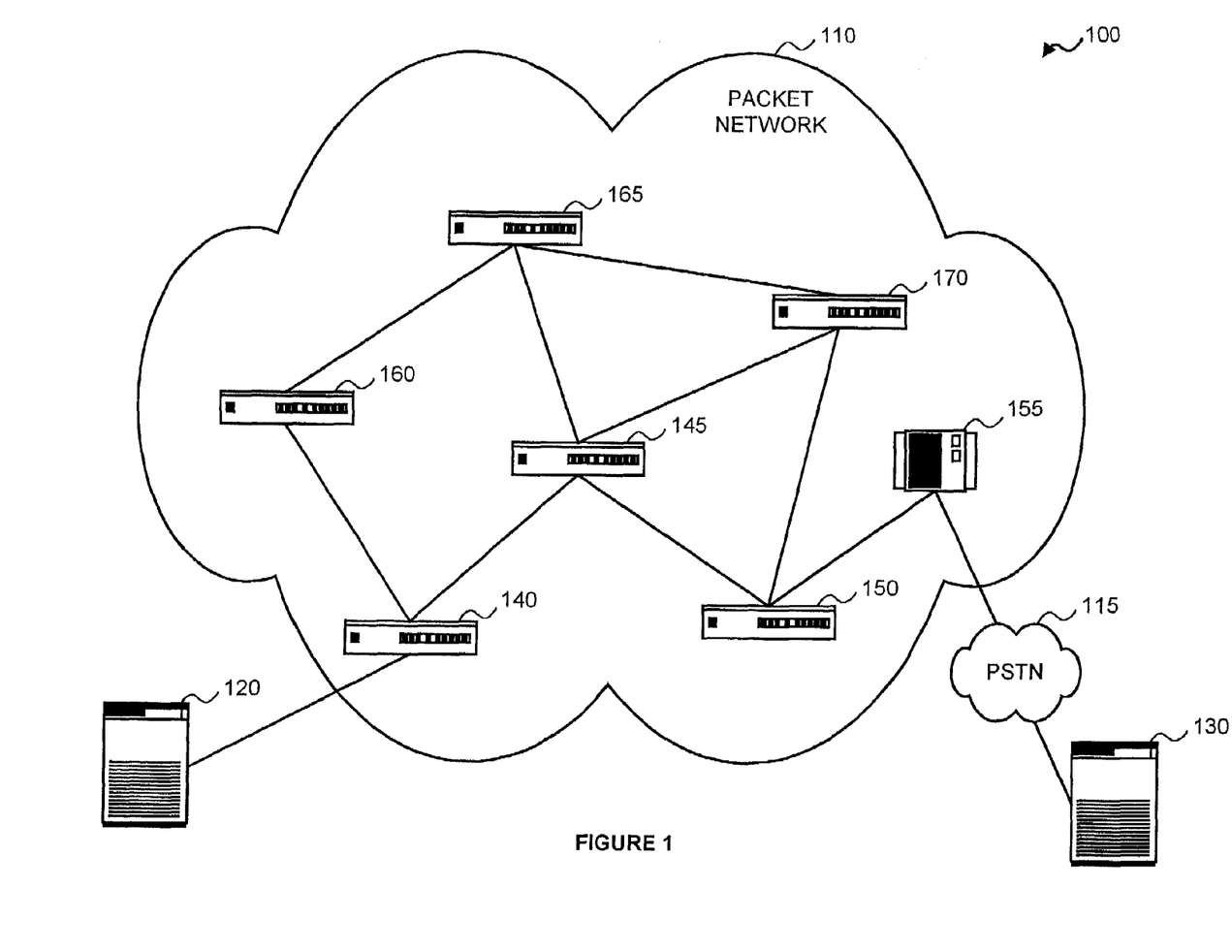
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
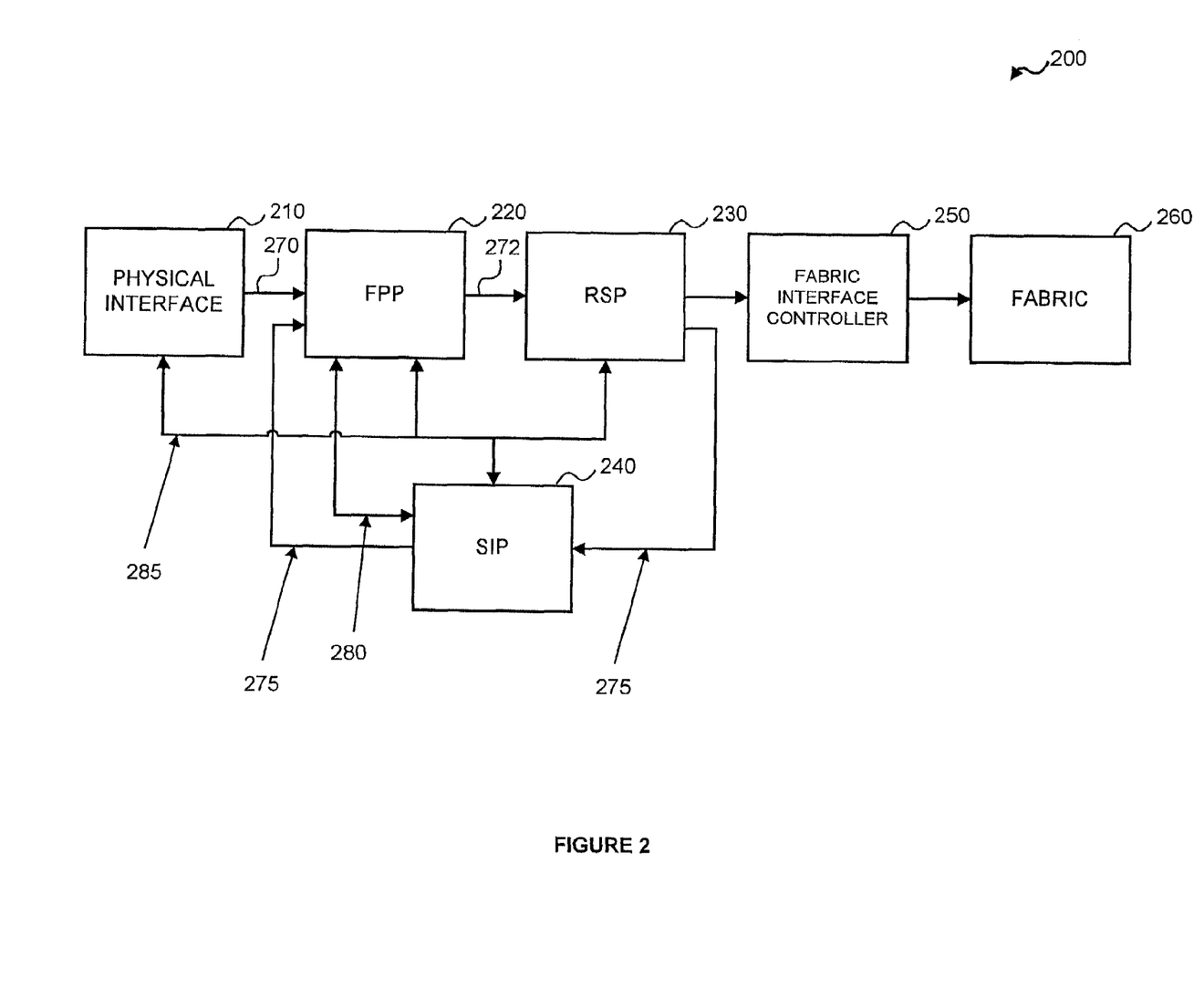
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units from the physical interface 210. The FPP 220 analyzes and classifies the protocol data units and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the protocol data units classified by the FPP 220. The RSP 230 uses the classification information received from the FPP 220 to determine the starting offset and the length of the Protocol data unit payload, which provides the classification conclusion for the Protocol data unit. The classification information may be used to determine the port and the associated RSP 230 selected for the Protocol data unit. The RSP 230 may also receive additional Protocol data unit information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
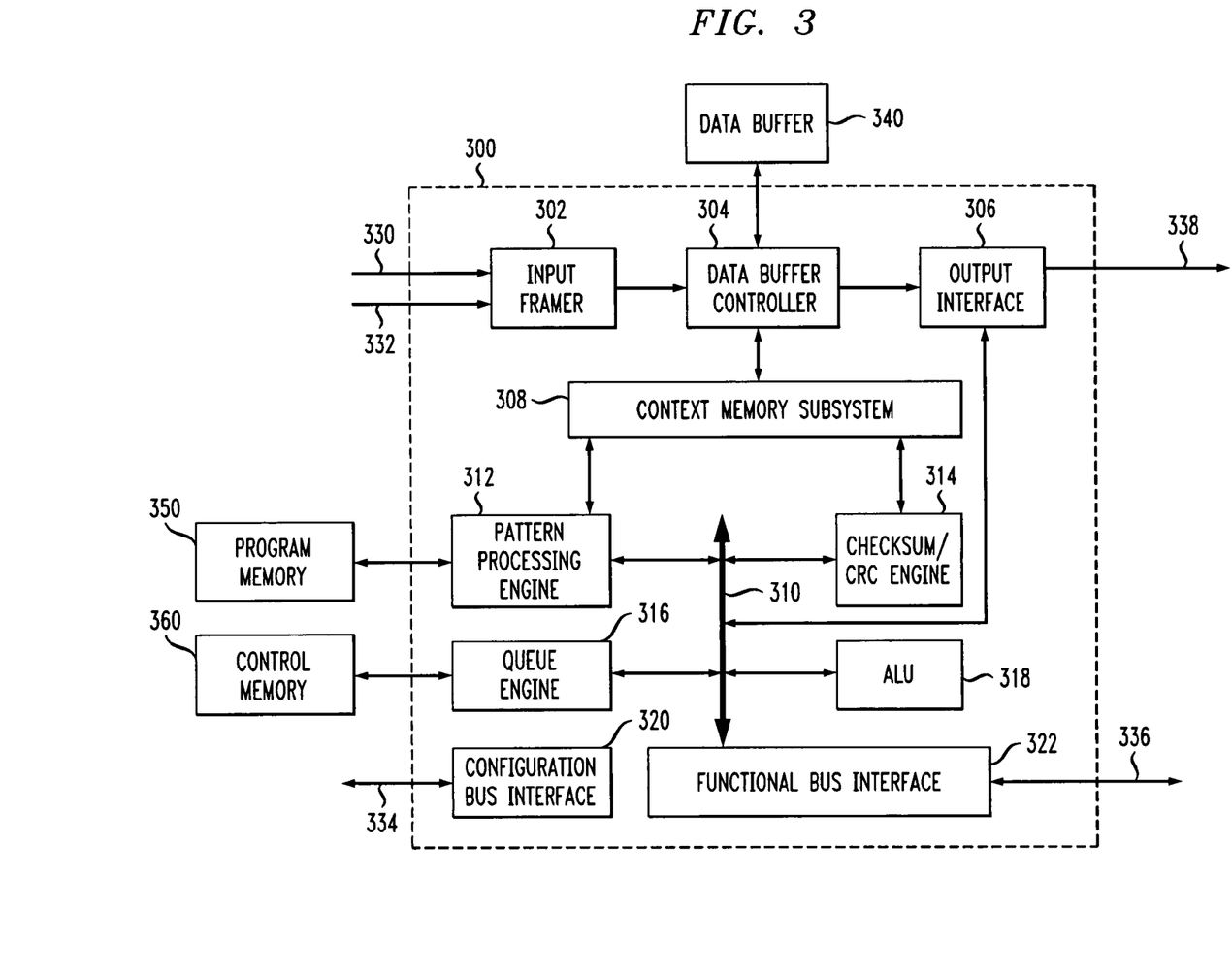
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives protocol data units via external input data streams 330, 332. The input framer 302 frames packets containing the protocol data units into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the protocol data units embodied with the processing block. The pattern processing engine 312 performs pattern matching to determine how protocol data units are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, protocol data units, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 320 for processing configuration requests from externally coupled processors. As illustrated, the configuration bus interface 320 may be coupled to a data port 334, such as an 8-bit CBI source.

Additionally, coupled to the internal function bus 310 is an output interface 306. The output interface 306 sends protocol data units and their classification conclusions to the downstream logic. The output interface 306 may retrieve the processing blocks stored in the data buffer 340 and send the protocol data units embodied within the processing blocks to an external unit through an output data port 338. The output data port 338, in an exemplary embodiment, is a 32-bit POS-PHY connected to the RSP 230 (FIG. 2). Additional background information concerning the FPP is discussed in U.S. patent application Ser. No. 9/798,472, titled "A VIRTUAL REASSEMBLY SYSTEM AND METHOD OF OPERATION THEREOF," and is incorporated herein by reference as if reproduced herein in its entirety.

Figure 4:
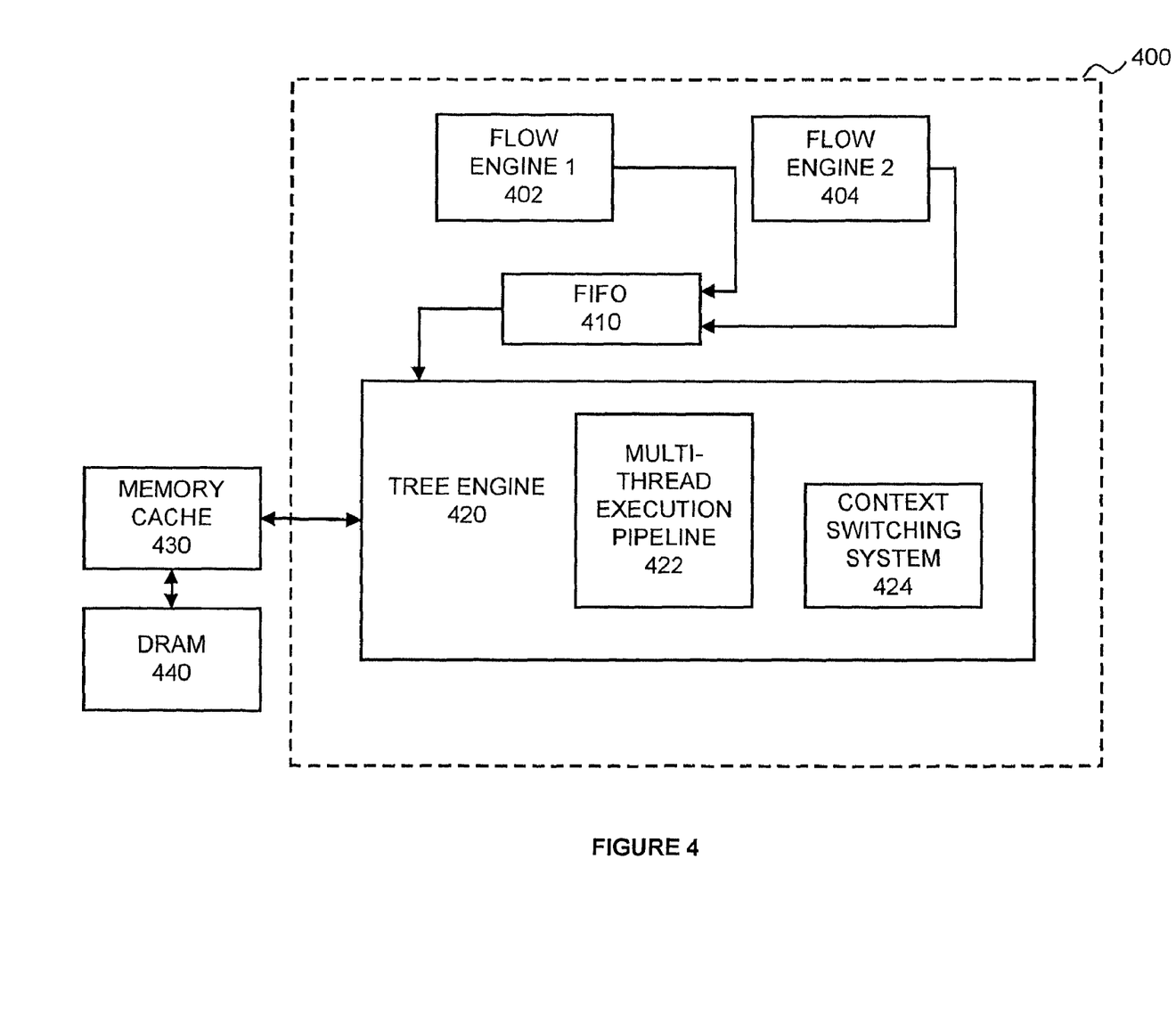
FIG. 4 illustrates a block diagram of an embodiment of a pattern processing engine, generally designated 400, of a fast pattern processor constructed according to the principles of the present invention.

Turning now to FIG. 4, illustrated is a block diagram of an embodiment of a pattern processing engine, generally designated 400, of a fast pattern processor constructed according to the principles of the present invention. The pattern processing engine, in one embodiment, is similar to the pattern processing engine 312 of FIG. 3 and performs pattern matching to determine how the protocol data units (PDUs) are classified and processed.

In the illustrated embodiment, the pattern processing engine 400 includes first and second flow engines 402, 404, a first-in-first-out buffer (FIFO) 410 and a tree engine 420. The pattern processing engine 400 is also coupled to a memory cache 430 and a dynamic random access memory (DRAM) 430. The tree engine 420 includes a multi-thread execution pipeline loop 422 and a context switching system 424. The tree engine is also coupled to the memory cache 430 and indirectly to the DRAM 440.

The pattern processing engine 400 employs the first and second flow engines 402, 404 to process the processing blocks based on their associated contexts. As described previously, the PDUs are framed into processing blocks for processing. Also, the processing of a PDU has an associated context, which is a processing thread (thread). Each of the first and second flow engines 402, 404 operate in a parallel, pipeline manner and are configured to process at least one of the processing blocks based on its context. In the illustrated embodiment, the first flow engine 402 processes even number contexts and the second flow engine 404 processes odd number contexts. Typically, the first and second flow engines 402, 404 may have several processing blocks associated with several contexts that are being processed at any one time. When the first and second flow engines 402, 404 finish processing a context, the first and second flow engines 402, 404 place the finished context (or thread) in the FIFO 410 to await processing by the tree engine 420.

In a related embodiment, the first and second flow engines 402, 404 transfer context (or thread) to the tree engine 420 when the FPL code associated with that context makes a call to be processed by the tree engine 420 to perform one or more functions, such as pattern matching. When the tree engine 420 finishes performing the function or functions, the tree engine 420 returns a result to the appropriate flow engine. That flow engine then resumes processing that context.

The tree engine 420, in one embodiment, is configured to process multiple contexts (of threads) that employ function trees to perform pattern matching or data validation on the PDU data contained within specific processing blocks or on at least a portion of the processing blocks. Function trees are a set of functions arranged in a tree structure. Each function tree has a root and can have any number branches off of the root. Each branch may also have any number of sub-branches and so on. Function tree processing starts at a root function and the outcome of the root function determines which branch to take. Each branch performs another function and the outcome of which determines the next branch to take and so on. One skilled in the art is familiar with tree structures having multiple branches. Also, for purposes of the present invention, the phrase "configured to" means that the device, the system or the subsystem includes the necessary software, hardware, firmware or a combination thereof to accomplish the stated task.

The tree engine 420 also employs the multi-thread execution pipeline loop 422 to sequence each thread through execution of its associated function tree. The multi-thread execution pipeline loop 422 has a number of stages, where each stage maintains information for a thread currently executing. See FIG. 5 for more information concerning a multi-thread execution pipeline loop and its associated stages. The tree engine 420 retrieves a thread from the FIFO 410 and places that thread at the beginning of the multi-thread execution pipeline loop 422 to start executing. As each thread traverses the multi-thread execution pipeline loop 422, the threads perform at least one function of its associate function tree on at least a portion of one or more of the associated processing blocks. In this manner, each thread sequences through the data depending upon the outcome of the function performed.

For example, one thread may first match the first three bits of the data. If the match was successful, then at the next stage of the multi-thread execution pipeline loop 422, the thread may try to match only the next two bits of the data. The tree engine 420 also allows each thread to take different branches depending upon the outcome of the function performed. If a thread reaches the end of the multi-thread execution pipeline loop 422 and the thread has not completed its processing, the thread may be looped back to the beginning of the multi-thread execution pipeline loop 422 to continue its processing. If a thread has finished its processing, the thread may return to one of the first or second flow engines 402, 404 or to another portion of the fast pattern processor for additional processing. In another embodiment, the thread may exit the multi-thread execution pipeline loop 422 at any stage without having to sequence to the end of the multi-thread execution pipeline loop 422.

Since the tree engine 420 may have a number of threads in its multi-thread execution pipeline loop 422 and each function tree can contain any number of functions and branches, the tree engine 420 employs the memory cache 430 and the DRAM 440 to retrieve the current function of the function tree for each thread. If the current function for a particular thread is not in the memory cache 430, a request to retrieve the current function is made to the DRAM 440. Fulfilling requests from the DRAM 440 typically incurs a longer fulfillment time than does fulfilling requests from the memory cache 430. This longer fulfillment time may be longer than the pipeline latency and cause the delay of one or more of the threads or prevent a new thread from being able to be added to the multi-thread execution pipeline loop 422 to begin execution. For purposes of the present invention, "pipeline latency" is the rate at which data or a thread traverses a multi-thread execution pipeline loop.

In the illustrated embodiment, the present invention advantageously employs the context switching system 424 to manage fulfillment requests that exceed the pipeline latency of the multi-thread execution pipeline loop 422. The context switching system 424 is configured to detect a device request from a thread executing within the multi-thread execution pipeline loop 422 for access to a device having a fulfillment latency that exceeds the pipeline latency and switches context for that thread, thus preventing that thread from executing until the device request is fulfilled. For purposes of the present invention, "fulfillment latency" is the rate at which it takes a device to fulfill a request. Also, see FIG. 5 for a more detailed description of the context switching system.

For example, if a thread within the multi-thread execution pipeline loop 422 issues a device request to access data in the memory cache 430 and the data is not within the memory cache 430, then a device request is made to obtain the data from the DRAM 440. Since the time to fulfill the device request from the DRAM 440 is longer than the pipeline latency, the context switching system 424 will prevent that particular thread from executing until the device request from the DRAM 440 is fulfilled. Thus, the context switching system 424 allows the other threads to continue to execute and does not cause the waste of execution cycles for that particular thread. The context switching system 424, in one embodiment, allows the thread that was prevented from executing to continue to traverse the multi-thread execution pipeline loop 422 until the device request is fulfilled. In this example, the thread would continue to traverse the multi-thread execution pipeline loop 422 until the DRAM 440 fulfilled the request for the data requested. Then, that thread would continue processing with another function from its associated function tree.

Figure 5:
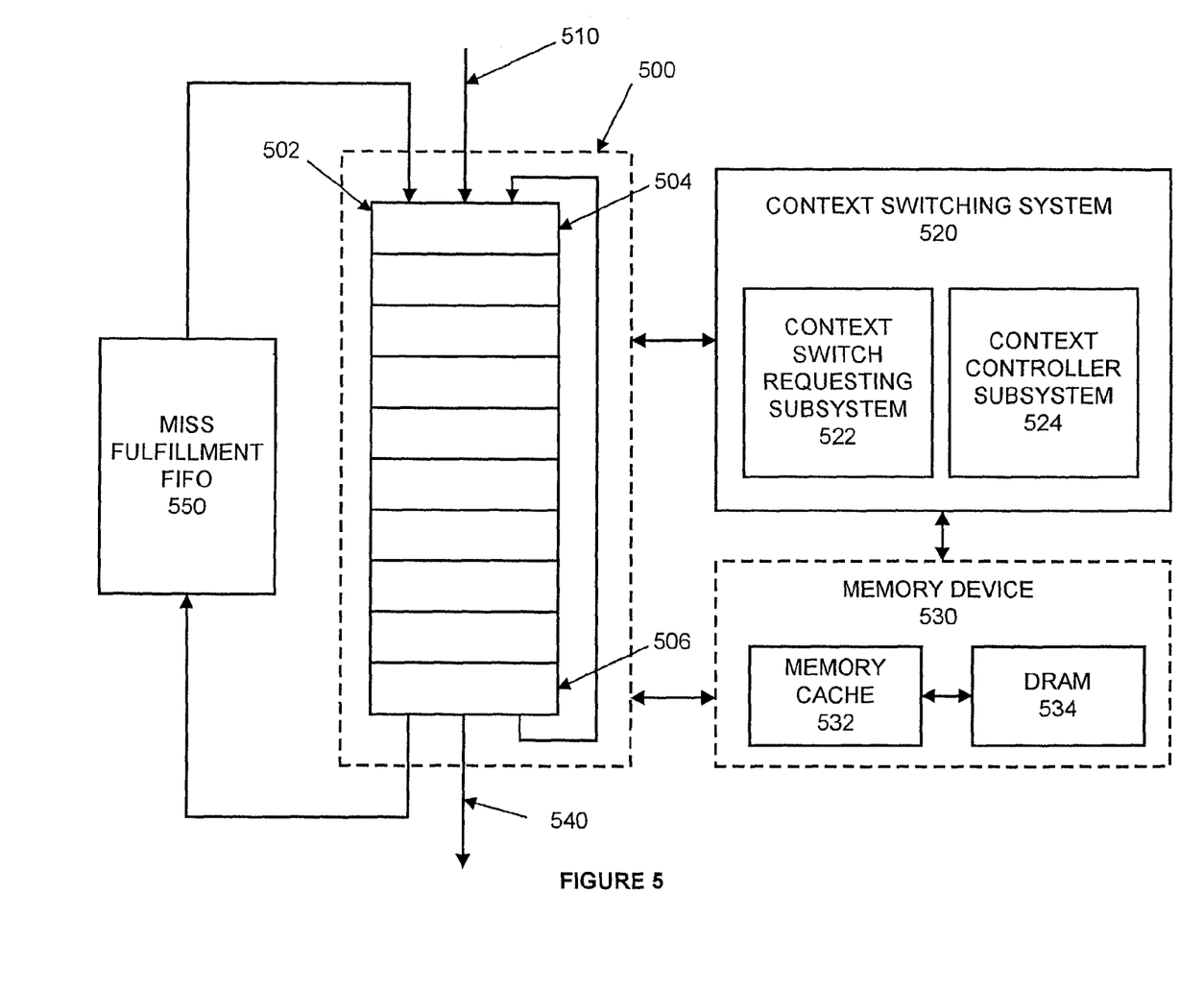
FIG. 5 illustrates a block diagram of a context switching system for a multi-thread execution pipeline loop constructed according to the principles of the present invention.

Turning now to FIG. 5, illustrated is a block diagram of a context switching system, generally designated 520, for a multi-thread execution pipeline loop 500 constructed according to the principles of the present invention. The multi-thread execution pipeline loop 500 may be used to sequence a thread (or a context) through its execution. In one embodiment, the multi-thread execution pipeline loop 500 may be used to sequence threads through their associated function trees. See FIG. 4 for a discussion of function trees.

In the illustrated embodiment, the multi-thread execution pipeline loop 500 includes 10 pipeline stages 502. Each of the pipeline stages 502 maintains information for the thread currently executing in that particular pipeline stage. Of course, however, the multi-thread execution pipeline loop 500 is not limited to only 10 pipeline stages and may have any number of pipeline stages depending upon its particular implementation.

The multi-thread execution pipeline loop 500 receives a thread to process though a receive line 510 and stores the thread's information at the beginning pipeline stage 504 when the beginning pipeline stage 504 is empty. In another embodiment, a new thread may be stored in any of the pipeline stages 502 that are empty. As the multi-thread execution pipeline loop 500 sequences, each thread moves to the next pipeline stage 502 and performs another function. When a thread reaches the end or last pipeline stage 506 of the multi-thread execution pipeline loop 500 and the thread has not finished processing, that thread is looped back to the beginning pipeline stage 504 of the multi-thread execution pipeline loop 500. If the thread has finished processing, the thread is sent out the output line 540. The finished thread may be sent to another processor, sub-processor or another area for additional processing. In a related embodiment, when a thread finishes processing, the thread may be removed from its current pipeline stage 502 and not wait until it reaches the last pipeline stage 506 of the multi-thread execution pipeline loop 500 to be removed.

The multi-thread execution pipeline loop 500 also has an associated pipeline latency. As described previously, a pipeline latency is the rate at which data or a thread traverses the multi-thread execution pipeline loop. For example, each pipeline stage may allow two clock cycles of execution for a thread in any given pipeline stage. Thus, multi-thread execution pipeline loop 500 has a pipeline latency of two clock cycles. In another embodiment, another method of defining a pipeline latency is the number of clock cycles for all of the pipeline stages of the multi-thread execution pipeline loop 500. For example, the illustrated multi-thread execution pipeline loop 500 includes 10 pipeline stages 502. If each pipeline stage allows two clock cycles of execution time, the pipeline latency for all of the pipeline stages would be 20 clock cycles. Of course, however, other methods of defining a pipeline latency are well within the scope of the present invention.

Associated with the multi-thread execution pipeline loop 500 is a memory device 530. The memory device 530 include a memory cache 532 coupled to a dynamic random access memory (DRAM) 534. The DRAM 534 may contain instructions for the threads executing within the multi-thread execution pipeline loop 500. The DRAM 534 may also contain data. The memory cache 532 caches certain instructions of the DRAM 534. In another embodiment of the present invention, the memory cache 532 may cache certain instructions, data or a combination thereof of the DRAM 534. The cache memory 532 may be conventional cache memory that is local or within the same processor as the multi-thread execution pipeline loop 500 and the DRAM 534 may be conventional external DRAM. However, the amount of the memory cache 532 available is typically smaller than the DRAM 534 due to the higher cost and limited space availability. Also, the memory cache 532 generally has a smaller fulfillment latency than the fulfillment latency of the DRAM 534. The longer fulfillment latency of the DRAM 534 is typically due to accessing an external memory device.

The multi-thread execution pipeline loop 500 is also coupled to the context switching system 520. The context switching system 520, in one embodiment, includes a context switch requesting subsystem 522 and a context controller subsystem 524. The context switch requesting subsystem 522 is configured to detect a device request from a thread executing within the multi-thread execution pipeline loop 500 for access to a device having a fulfillment latency exceeding the pipeline latency of the multi-thread execution pipeline loop 500. The context switch requesting subsystem 522 is further configured to generate a context switch request for the thread that issued the device request.

The context controller subsystem 524 is configured to receive the context switch request from the context switch requesting subsystem 522 and prevent the thread from executing until the device request is fulfilled. The context controller subsystem 524, in one embodiment, is further configured to replace the thread's current instruction with a NO-Operation (NOP) instruction to prevent the thread from executing until the device request is fulfilled. The context controller subsystem 524 may also allow the thread to continue to traverse the multi-thread execution pipeline loop 500 while waiting for the device request to be fulfilled. In a related embodiment, the context controller subsystem 524 is further configured to allow the other threads within the multi-thread execution pipeline loop 500 to continue to execute while the thread that made the device request is waiting for the device request to be fulfilled.

In one embodiment, the device request may be a request to access external memory due to a cache miss status. For example, a thread may request to access an instruction from the memory cache 532. If the information is not currently in the memory cache 532, a cache miss status is issued by the memory device 530 and a request is made to the DRAM 534 to access the desired information. As stated previously, the DRAM 534 has a longer fulfillment latency and is typically longer than the pipeline latency of the multi-thread execution pipeline loop 500. If the multi-thread execution pipeline loop 500 delayed execution of all the threads within the pipeline until the request for one thread to the DRAM 534 was fulfilled, the throughput of the multi-thread execution pipeline loop 500 would be unduly delayed. Also, the multi-thread execution pipeline loop 500 may not be able to maintain a desired processing bandwidth.

The present invention, in one embodiment, advantageously overcomes the problems associated with a device request to access a device having a fulfillment latency exceeding the pipeline latency of the multi-thread execution pipeline loop 500 by employing the context switching system 520. In the above example, the context switch requesting subsystem 522 or the context switching system 520 detects the device request to access external memory, such as the DRAM 534, due to a cache miss status. Upon detecting the device request, the context switch requesting subsystem 522 also generates a context switch request for the thread that issued the device request. The context controller subsystem 524 of the context switching system 520 receives the context switch request and prevents that thread from executing until the device request to the external memory is fulfilled. The context controller subsystem 524, in one embodiment, also allows the other threads within the multi-thread execution pipeline loop 500 to continue to execute. Thus, the context switching system 520 can maintain the throughput of the multi-thread execution pipeline loop 500 and maintain the desired processing bandwidth.

The context switching system 520 may further include a miss fulfillment first-in-first-out buffer ("miss fulfillment FIFO") 550 to accommodate a thread or threads that are waiting for fulfillment of device requests to devices having a fulfillment latency that exceeds the pipeline latency of the multi-thread execution pipeline loop 500. In one embodiment, the context controller subsystem 524 is further configured to employ the miss fulfillment FIFO 550 to store the thread and/or its related information in the miss fulfillment FIFO 550 upon reaching the end position (or the last pipeline stage 506) of the multi-thread execution pipeline loop 500. In a related embodiment, the context controller subsystem 524 may store the thread in the miss fulfillment FIFO 550 upon receiving a context switch request for that thread instead of waiting for the thread to reach the end position of the multi-thread execution pipeline loop 500. By the context controller subsystem 524 storing the thread in the miss fulfillment FIFO 550 upon receiving a context switch request, the context switching system 520 advantageously allows the multi-thread execution pipeline loop 500 to receive and process a new thread. Thus, the multi-thread execution pipeline loop 500 may be filled with threads performing useful work and, as such, increasing the dprocessing throughput.

The context controller subsystem 524 is further configured to sequence the stored thread through the miss fulfillment FIFO 550 and reinsert the thread into the multi-thread execution pipeline loop 500 at a beginning position (or the beginning pipeline stage 504). In a related embodiment, the context controller subsystem 524 is further configured to sequence the thread through the miss fulfillment FIFO 550 at a rate equal to the pipeline latency of the multi-thread execution pipeline loop 500. Of course, however, the present invention is not limited to sequencing at a rate equal to the pipeline latency. Other embodiments of the present invention may sequence the thread through the miss fulfillment FIFO 550 at any rate.

Once a thread has been stored in the miss fulfillment FIFO 550, a new thread may be inserted at the beginning pipeline stage 504 of the multi-thread execution pipeline loop 500 when the beginning pipeline stage 504 is an empty. Alternatively, a new thread may be stored in any empty pipeline stage. Thus, the context switching system 520 advantageously employs the miss fulfillment FIFO 550 to allow the thread to wait for its device request to be fulfilled or delay the thread for a period of time, while allowing another thread to start executing in the multi-thread execution pipeline loop 500.

One skilled in the art should know that the present invention is not limited to switching context based upon a request to DRAM that has a fulfillment latency greater than the pipeline latency. In other embodiments, the present invention may perform context switching for any request to any device that has a fulfillment latency that exceeds the pipeline latency.

Figure 6:
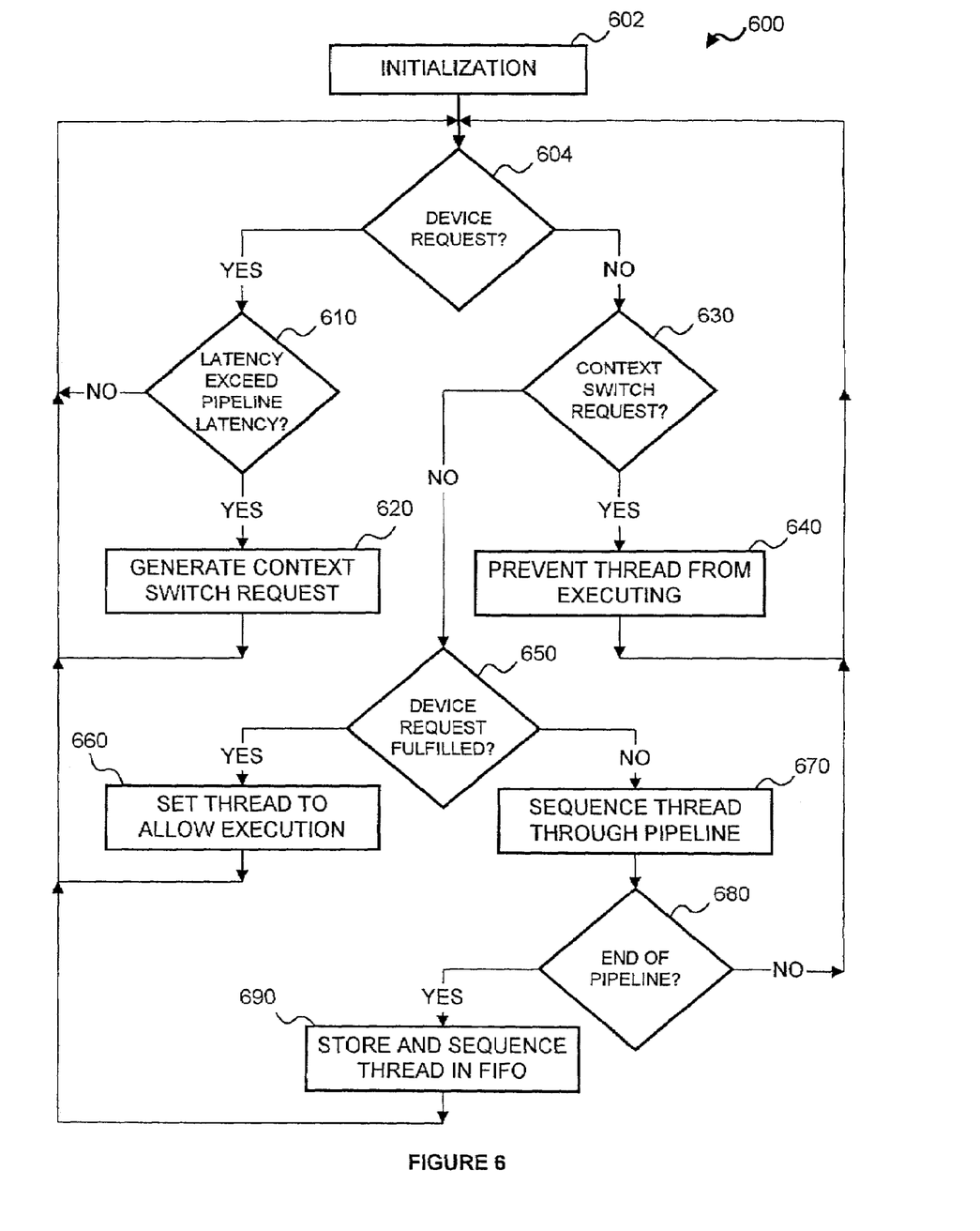
FIG. 6 illustrates a flow diagram of an embodiment of a method of operating a context switching system for a multi-thread execution pipeline loop constructed in accordance with the principles of the present invention.

Turning now to FIG. 6, illustrated is a method of operating a context switching system, generally designated 600, for a multi-thread execution pipeline loop constructed according to the principles of the present invention. In FIG. 6, the method 600 first performs initialization in a step 602.

After initialization, the method 600 determines if there is a device request from a thread executing within the multi-thread execution pipeline loop for access to a device in a decisional step 604. If the method 600 determined that there was a device request, the method then determines if the device request is to a device having a fulfillment latency exceeding the pipeline latency of the multi-thread execution pipeline loop in a decisional step 610. If the device does not have a fulfillment latency that exceeds the pipeline latency, the method 600 allows the device request to process as normal and returns to determine the next type of request in the decisional step 604. If the device has a latency that does exceed the pipeline latency, the method 600 then generates a context switch request for that thread in a step 620. For example, the device request may be to access an external DRAM, which typically has a fulfillment latency that exceeds the pipeline latency. The method 600 then returns to determine the next type of request in the decisional step 604.

If there is not a device request in the decisional step 604, the method 600 then determines if it received a context switch request in a decisional step 630. If a context switch request was received, the method 600 then prevents the thread associated with the context switch request from executing until the device request is fulfilled in a step 640. In a related embodiment, preventing the thread from executing may further include replacing the thread's current instruction with a NOP instruction to prevent the thread from executing until the device request is fulfilled. Of course, however, the present invention is not limited to using NOP instructions to prevent a thread from executing. In other embodiments of the present invention, any type of instruction or flag may be used to prevent the thread from executing. In another embodiment, the method 600 may also allow the threads within the multi-thread execution pipeline loop to continue to execute while the thread is waiting for its device request to be fulfilled. Next, the method 600 returns to determine the next type of request in the decisional step 604.

If a context switch request was not received in the decisional step 630, the method 600 then determines if the device request for the associated thread has been fulfilled in a decisional step 650. If the device request has been fulfilled, the method 600 then sets the thread to allow execution again in a step 660. In one embodiment, the method 600 may replace the thread's NOP instruction with the thread's original instruction before the device request was issued. In a related embodiment, the method 600 may store a retrieved instruction from the device and then allow the thread to execute the retrieved instruction. The method 600 then returns to determine the next type of request in the decisional step 604.

If it was determined that the device request was not fulfilled in the decisional step 650, the method 600 then sequences the thread that was prevented from executing through the multi-thread execution pipeline loop in a step 670. In another embodiment, the method 600 allows the other threads to also sequence through the multi-thread execution pipeline loop.

In the illustrated embodiment, the method 600 then determines if the thread that was prevented from executing has reached the end (or last pipeline stage) of the multi-thread execution pipeline loop in a decisional step 680. If the thread did not reach the end of the multi-thread execution pipeline loop, the method 600 then returns to determine the next type of request in the decisional step 604. If the thread has reached the end of the multi-thread execution pipeline loop, the method may store the thread in a miss fulfillment FIFO in a step 690. The method 600 may also sequence the thread through the miss fulfillment FIFO at a rate equal to the pipeline latency of the multi-thread execution pipeline loop. Of course, however, the present invention may sequence the thread through the miss fulfillment FIFO at any rate. Once the thread reaches the end of the miss fulfillment FIFO, the thread is reinserted at the beginning of the multi-thread execution pipeline loop to continue processing. The method 600 then returns to determine the next type of request in the decisional step 604.

One skilled in the art should know that the present invention is not limited to processing only one device request from a thread for access to a device having a fulfillment latency exceeding the pipeline latency of the multi-thread execution pipeline loop. The present invention and method may process any number of device requests from any number of threads for access to devices having a fulfillment latency exceeding the pipeline latency of the multi-thread execution pipeline loop. Also, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A context switching system for a multi-thread execution pipeline loop having a pipeline latency, comprising:
   i. A single miss fulfillment first-in-first-out buffer (FIFO);
   ii. A context switch requesting subsystem configured to:
      (1) Detect a device request from a first thread executing within said multi-thread execution pipeline loop for access to a device having a fulfillment latency exceeding said pipeline latency, and
      (2) Generate a context switch request for said first thread; and
   iii. A context controller subsystem configured to receive said context switch request and, based thereon, store said first thread in said single miss fulfillment FIFO to prevent said first thread from executing until said device request is fulfilled, said first thread sequencing entirely through said single miss fulfillment FIFO at a rate equivalent to said pipeline latency before exiting therefrom.

2. The context switching system as recited in claim 1 wherein said context controller subsystem is further configured to allow a new thread to enter said multi-thread execution pipeline loop after storing said first thread in said miss fulfillment FIFO.

3. The context switching system as recited in claim 1 wherein said context controller subsystem is further configured to allow other threads within said multi-thread execution pipeline loop to continue to execute while said first thread is waiting for said device request to be fulfilled.

4. The context switching system as recited in claim 1 wherein said context controller subsystem is further configured to:
   i. Store said first thread in said miss fulfillment FIFO upon reaching an end position of said multi-thread execution pipeline loop, and
   ii. Reinsert said first thread into said multi-thread execution pipeline loop at a beginning position after said first thread exits said miss fulfillment FIFO.

5. The context switching system as recited in claim 1 wherein said first thread is looped back to a beginning stage of said multi-thread execution pipeline loop when said first thread reaches an end stage of said multi-thread execution pipeline loop and said first thread has not finished processing.

6. The context switching system as recited in claim 1 wherein said device request is a request to access external memory due to a cache miss status.

7. For use with a multi-thread execution pipeline loop having a pipeline latency, a method of operating a context switching system, comprising:
   i. Detecting a device request from a first thread executing within said multi-thread execution pipeline loop for access to a device having a fulfillment latency exceeding said pipeline latency;
   ii. Generating a context switch request for said first thread when said first thread issues said device request; and
   iii. Receiving said context switch request and storing said first thread based thereon in a single miss fulfillment first-in-first-out buffer (FIFO) until said device request is fulfilled, said first thread sequencing entirely through said single miss fulfillment FIFO at a rate equivalent to said pipeline latency before exiting therefrom.

8. The method as recited in claim 7 further comprising allowing a new thread to enter said multi-thread execution pipeline loop after storing said first thread in said miss fulfillment FIFO.

9. The method as recited in claim 7 further comprising allowing other threads within said multi-thread execution pipeline loop to continue to execute while said first thread is waiting for said device request to be fulfilled.

10. The method as recited in claim 7 further comprising:
    i. Storing said first thread in said miss fulfillment FIFO upon reaching an end position of said multithread execution pipeline loop, and
    ii. Reinserting said first thread into said multi-thread execution pipeline loop at a beginning position after said first thread exits said miss fulfillment FIFO.

11. The method as recited in claim 7 further comprising looping said first thread back to a beginning stage of said multi-thread execution pipeline loop when said first thread reaches an end stage of said multi-thread execution pipeline loop and said first thread has not finished processing.

12. The method as recited in claim 7 wherein said device request is a request to access external memory due to a cache miss status.

13. A fast pattern processor that receives and processes protocol data units (PDUs), comprising:
    i. A dynamic random access memory (DRAM) that contains instructions;
    ii. A memory cache that caches certain of said instructions from said DRAM; and
    iii. A tree engine that parses data within said PDUs and employs said DRAM and said memory cache to obtain ones of said instructions, including:
       (1) A multi-thread execution pipeline loop having a pipeline latency, and (2) A context switching system for said multi-thread execution pipeline loop, having:
   (a) A single miss fulfillment first-in-first-out buffer (FIFO);
   (b) A context switch requesting subsystem that:
      (i) Detects a device request from a first thread executing within said multithread execution pipeline loop for access to a device having a fulfillment latency exceeding said pipeline latency, and
      (ii) Generates a context switch request for said first thread, and
   (3) A context controller subsystem that receives said context switch request and, based thereon, stores said first thread in said single miss fulfillment FIFO until said device request is fulfilled, said first thread sequencing entirely through said single miss fulfillment FIFO at a rate equivalent to having a said pipeline latency before exiting therefrom.

14. The fast pattern processor as recited in claim 13 wherein said context controller subsystem further allows a new thread to enter said multi-thread execution pipeline loop after said first thread is stored in said FIFO.

15. The fast pattern processor as recited in claim 13 wherein said context controller subsystem further allows other threads within said multi-thread execution pipeline loop to continue to execute while said first thread is waiting for said device request to be fulfilled.

16. The fast pattern processor as recited in claim 13 wherein said context switching system is further configured to:
   i. Store said first thread in said miss fulfillment FIFO upon reaching an end position of said multithread execution pipeline loop, and
   ii. Reinsert said first thread into said multi-thread execution pipeline loop at a beginning position after said first thread exits said miss fulfillment FIFO.

17. The fast pattern processor as recited in claim 13 wherein said first thread is looped back to a beginning stage of said multi-thread execution pipeline loop when said first thread reaches an end stage of said multi-thread execution pipeline loop and said first thread has not finished processing.

18. The fast pattern processor as recited in claim 13 wherein said device is said DRAM and said device request is a request to access said DRAM due to a cache miss status from said memory cache.

* * * * *